United States Patent [19]

Johnson et al.

[11] 4,148,246
[45] Apr. 10, 1979

[54] HIGH SPEED SPINDLE AND DRAW BAR ASSEMBLY

[75] Inventors: Charles R. Johnson, Howell, Mich.; John K. Forlow, Rockford, Ill.; Paul G. Black, Whitmore Lake, Mich.; William A. Mitchell; John S. Clark, both of Springfield, Vt.

[73] Assignee: Ex-Cell-O Corporation, Troy, Mich.

[21] Appl. No.: 904,825

[22] Filed: May 11, 1978

Related U.S. Application Data

[63] Continuation-in-part of Ser. No. 767,013, Feb. 9, 1977.

[51] Int. Cl.² .............................................. B23C 5/26
[52] U.S. Cl. .................. 90/11 D; 408/239 A
[58] Field of Search .............. 90/11 D; 408/239 R, 408/239 D; 25/568

[56] References Cited

U.S. PATENT DOCUMENTS

| | | | |
|---|---|---|---|
| 3,520,228 | 7/1970 | Wohlfeil | 90/11 D |
| 3,842,712 | 10/1974 | Bondie et al. | 90/11 D |
| 3,893,371 | 7/1975 | Frazier | 90/11 D X |
| 3,898,911 | 8/1975 | De Caussin | 408/239 R |

*Primary Examiner*—Gil Weidenfeld
*Attorney, Agent, or Firm*—James H. Bower; Mitchell J. Hill

[57] ABSTRACT

A machine tool high speed spindle assembly and draw bar assembly, wherein the spindle assembly includes a hollow, rotary spindle shaft, and the draw bar assembly is nonrotational relative to the spindle shaft. The draw bar assembly is axially movable within the hollow rotary spindle shaft, and it includes a tool holder gripping means. The draw bar assembly rotates with the hollow rotary spindle shaft during a machining operation. The draw bar assembly with its tool holder gripping means is moved by an actuator means between an operative position for retaining a tool holder or the like in the spindle shaft, and an inoperative position to permit a tool holder or the like to be removed from or inserted into the spindle shaft. A spindle shaft holding or gripping means retains the hollow rotary spindle shaft in a stationary position when the draw bar actuator means moves the draw bar assembly between said operative and inoperative positions. The spindle shaft holding means comprises a collet means having relatively movable collet members and collet clamp ring members. The draw bar assembly actuator means includes a detachable spline means having relatively movable spline members and a drive motor means. The draw bar assembly actuator means and spindle shaft holding means are free from the spindle shaft and have no physical contact with said shaft during a machine tool operation.

12 Claims, 15 Drawing Figures

FIG.1A

HIGH SPEED SPINDLE AND DRAW BAR ASSEMBLY

BACKGROUND OF THE INVENTION

This is a continuation-in-part application Ser. No. 767,013, filed Feb. 9, 1977.

1. Field of the Invention

This invention relates generally to machine tool assemblies and components therefor, such as hollow rotary spindle shafts and draw bar assemblies for use with machine tools in the performance of various types of operations such as milling, drilling, boring, tapping, and the like. The invention is particularly concerned with a machine tool high speed hollow rotary spindle shaft in which is mounted an axially movable, nonrotational draw bar assembly that includes a tool holder gripping means. The draw bar assembly, with the tool gripping means, functions to draw a tool holder into a tight frictional engagement with a seat formed in a tapered bore in the spindle shaft, and the draw bar assembly with the tool holder gripping means rotates with the spindle shaft.

2. Description of the Prior Art

It is known in the machine tool art to provide hollow rotary spindle shafts in which are releasably mounted tool holders, or the like, that are held in position by a draw bar assembly that includes a tool holder gripping means, such as a collet means. The draw bar assembly is generally biased by springs to an operative position so as to secure a tool holder in a seat in a tapered bore in the spindle shaft by frictional engagement. The prior art draw bar assemblies are actuated from an operative tool holder retaining position to an inoperative tool holder releasing position against the bias of the springs by a suitable actuator means, such as a hydraulic motor, or the like, when it is desired to remove a tool holder from a spindle shaft. Examples of the aforedescribed machine tool spindle shafts and draw bar assemblies and tool holder gripping means are illustrated in U.S. Pat. Nos. 3,516,149, 3,520,228, and 3,875,848.

A problem and disadvantage of the prior art draw bar assemblies and tool holder gripping means is that they exert a thrust on a rotary spindle shaft when the spindle actuatoe means is operated. The last mentioned thrust force on a spindle shaft is injurious to the spindle shaft high speed bearings. A further problem with the prior art draw bar assemblies and tool holder gripping means is that there is no way of indicating to the operator, when the draw bar assembly is moved to the operative position, and as to whether or not a new tool holder has been moved into position in the spindle shaft or whether or not the tool holder gripping means is broken.

SUMMARY OF THE INVENTION

In accordance with the present invention, the draw bar assembly with a tool holder gripping means is mounted in a hollow rotary spindle shaft, and the draw bar assembly is retained in a nonrotational position in the spindle shaft, but it is arranged and constructed for axial movement with respect to the spindle shaft between an operative position for retaining a tool holder or the like in the spindle shaft, and an inoperative position to permit a tool holder or the like to be removed from, or inserted into the spindle shaft. The draw bar assembly is moved between said operative and inoperative positions by an actuator means that includes a drive motor and a spline means for selective connection and disconnection of the drive motor and the draw bar assembly. A collet type spindle shaft holder means is provided for holding the spindle shaft stationary when the draw bar assembly is moved between said operative and inoperative positions. An indicator means is operatively connected to the drive motor for indicating an inoperative tool holder gripping means, or a no-tool holder condition. The spline means for connecting the drive motor to the draw bar assembly comprises a relatively movable female spline member and a male spline member. The spindle shaft holder means includes a relatively movable collet member and a collet clamp ring member. The spline means that drives the draw bar assembly is connected to the draw bar assembly by a rotatable drive means which includes a driven screw provided with left hand thread for safety purposes to prevent accidental unwinding of the rotatable drive means. The draw bar assembly is held in a nonrotational position relative to the hollow spindle shaft by providing the draw bar assembly with a polygon cross sectional shape at one portion thereof which is slidably mounted in a corresponding polygon sleeve portion in the hollow spindle shaft. The mating portions of the draw bar assembly and spindle shaft eliminate vibration since these mating parts are initially balanced in accordance with the polygon shape.

Other features and advantages of this invention will be apparent from the following detailed description, appended claims, and the accompanying drawings.

DESCRIPTION OF THE PREFERRED EMBODIMENT

Figures 1, 2:
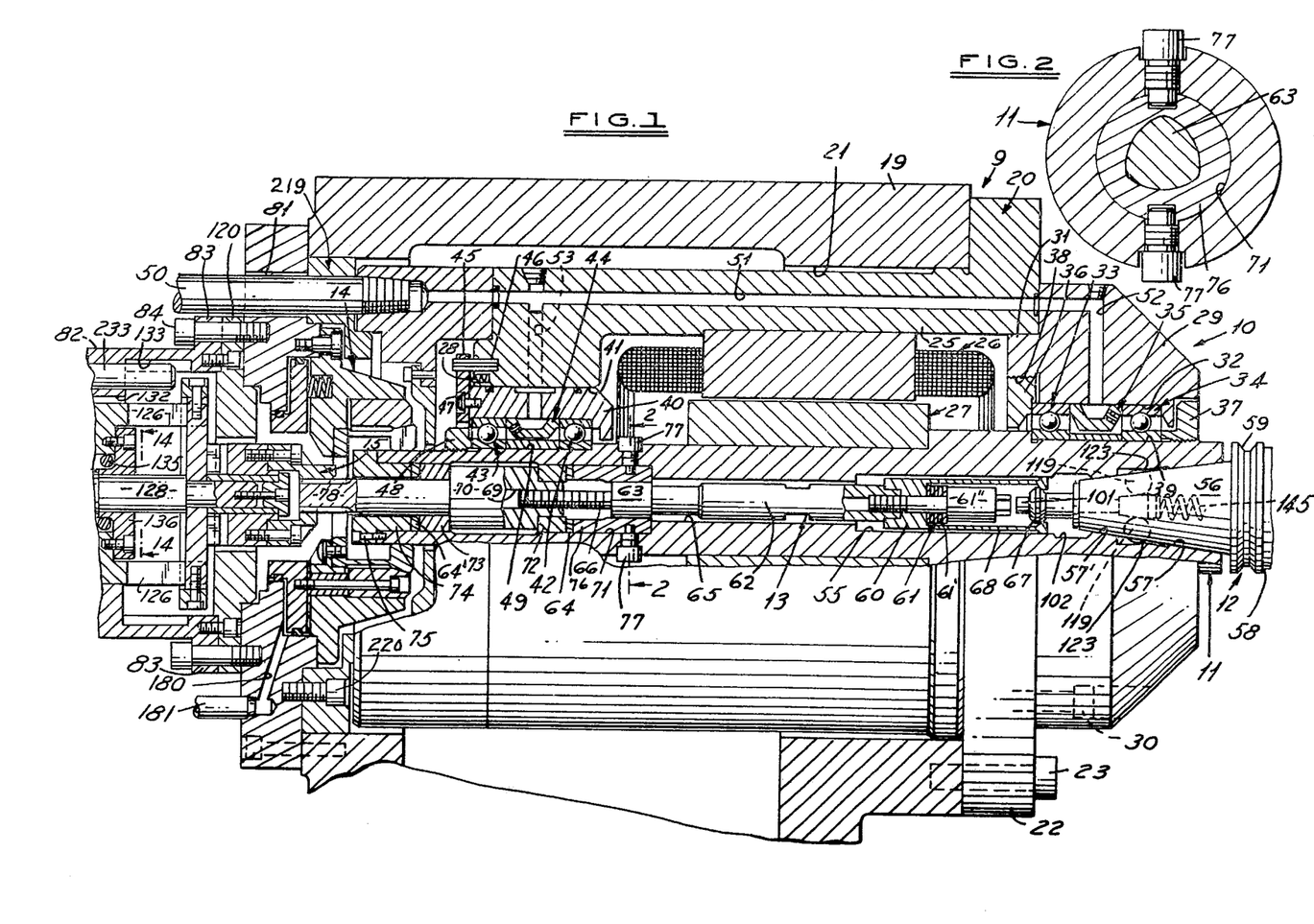
FIG. 1 is a fragmentary, longitudinal view, partly in section, of the front portion of a high speed rotary spindle assembly and draw bar assembly made in accordance with the principles of the present invention.
FIG. 2 is a fragmentary, elevation section view of the structure illustrated in FIG. 1 taken along the line 2—2 thereof, and looking in the direction of the arrows.

Referring now to the drawings, and in particular to FIG. 1, the numeral 9 generally designates a portion of a machine tool in which is operatively mounted a high speed spindle assembly, generally indicated by the numeral 10. The spindle assembly 10 includes a hollow spindle shaft which is generally indicated by the numeral 11 and which operatively carries a tool holder, generally indicated by the numeral 12. The tool holder 12 is releasably retained in the spindle shaft 11 by a draw bar assembly, generally indicated by the numeral 13, and which includes a tool holder gripping means. The numeral 14 generally designates a collet type releasable spindle shaft holding means for holding the spindle shaft 11 stationary when the draw bar and tool holder gripping means 13 is actuated axially within the spindle shaft 11 for either releasing the tool holder 12 or drawing the same into its operative position in the spindle shaft 11, as shown in FIG. 1. The numeral 15 generally designates a releasable spline means for connecting and disconnecting the draw bar assembly 13 to a hydraulic drive motor, generally indicated by the numeral 16 in FIG. 1A. The numeral 17 in FIG. 1A generally designates a switch means which functions as a broken collet or no-tool holder indicator means, as more fully described hereinafter.

As shown in FIG. 1, the numeral 20 generally designates a spindle shaft electric drive motor housing which is operatively mounted in a bore 21 formed in a machine tool housing portion designated by the numeral 19. The spindle shaft motor housing 20 is provided with an integral flange 22 on the front end thereof which is secured to the machine tool housing portion 19 by any suitable means, as by a plurality of machine screws 23. Operatively mounted in a bore 25 in the spindle shaft motor housing 20 is a motor stator, generally indicated by the numeral 26, for a conventional electric drive motor for rotating the spindle shaft 11. A rotor for the spindle shaft drive motor is generally designated by the numeral 27, and it is fixed by any suitable means on the outer periphery of the spindle shaft 11. The front end of the bore 25 in the motor housing 20 is enclosed by a fixed spindle head 29 which is releasably secured to the front face of the motor housing flange 22 by any suitable means, as by a plurality of machine screws 30. The spindle head 29 is provided with an integral reduced diameter portion 31 which is slidably seated within the outer end of the motor housing bore 25.

The spindle shaft 11 is rotatably mounted at the front end thereof by a pair of suitable high speed ball bearing means, generally indicated by the numerals 33 and 34, and which are operatively mounted in an axial bore 32 in the spindle head 29. The ball bearing means 33 and 34 are laterally spaced apart by a spreader ring means and spacer sleeve assembly generally indicated by the numeral 35. A bearing locking ring 36 is threadably mounted in a threaded bore 38 formed in the spindle head 29 at the inner end of the bore 32. The bearing locking ring 36 bears against the outer race of the front inner ball bearing means 33. The outer race of the front outer ball bearing means 34 is seated against a shoulder formed at the outer end of the bore 32. The inner races of the ball bearing means 33 and 34 are operatively mounted on the front end of the spindle shaft 11, on the spindle shaft periphery portion designated by the numeral 39. The inner races of the front inner ball bearing means 33 is seated against a shoulder on the spindle shaft 11. A bearing retainer collar 37 is threadably mounted on the front end of the spindle body periphery portion 39, and it bears against the inner race of the front outer ball bearing means 34 for retaining the inner ball bearing races in an operative position on the spindle shaft 11.

As shown in FIG. 1, the rear end of the spindle shaft 11 is rotatably supported by a pair of suitable high speed ball bearing means, generally indicated by the numerals 42 and 43, which have their inner races operatively mounted around the spindle shaft periphery portion 49, and their outer races operatively mounted in a bore in an annular bearing block 40. The bearing block 40 is slidably mounted for longitudinal movement in a bore 41 in the motor housing 20. A circular retainer ring 45 is secured by suitable machine screws 47 to the outer end of the bearing block 40. A plurality of spring means 28 is operatively mounted between the bearing block 40 and the retainer ring 45 for imparting a rearwardly directed axial spring bias on the bearing block 40. The spingle shaft rear ball bearing means 42 and 43 are spaced apart by a suitable spreader ring means and spacer sleeve assembly, generally indicated by the numeral 44. The retainer ring 45 and the bearing block 40 are held stationary against rotary movement by roll pin 46 which has one end fixed in the motor housing 20 and the other end slidably mounted through a suitable bore in the retainer ring 45. The outer races of the rear bearing means 42 and 43 are retained in their operative position in the bearing block 40 by the retainer ring 45. The inner races of the rear bearing means 42 and 43 are retained on the spindle shaft periphery 49 by a retainer ring 48 which is threadably mounted on the spindle shaft periphery 49 and which bears against the inner race of the rear bearing means 43. The inner race of the rear bearing means 42 is positioned against a shoulder formed on the spindle shaft 11. The high speed spindle ball bearing means 33, 34, 42 and 43 are provided with a suitable lubricant through the bearing lubricant tubing 50 which communicates with the lubricant passages 51, 52 and 53.

As shown in FIG. 1, the tool holder 12 is provided with the usual tapered shank 56 which is operatively seated in the spingle shaft 11 in a tapered socket which comprises a pair of spaced apart, aligned outer and inner tapered bores or seats 57 and 57'. The tool holder 12 may be of any suitable conventional type, as for example, the self-locking tool holder illustrated in detail in our co-pending United States continuation-in-part patent application entitled "SELF-LOCKING CHUCK", Ser. No. 767,176, filed on Feb. 9, 1977.

The tool holder 12 includes a tool holder body 58 around which is formed a V-shaped slot 59 for the reception of a conventional tool changer arm for inserting and removing the tool holder 12 from the tapered bores 57 and 57' in the spindle shaft 11. The rear end of the tool holder 12 extends rearwardly in the spindle shaft 11 into an annular grove 102 which communicates with the tapered bores 57 and 57'. A rearwardly extending bore 55 communicates with the annular groove 102. A conventional collet means is axially movable in the bore 55, and it includes a collet body 60 and a plurality of integrally connected collet fingers 68 which are adapted to be operatively engaged with a grip a retention knob 67 which is carried by the tool holder shank 56. The last mentioned collet means is shown in FIG. 1 in a tool holder gripping position wherein the tool holder 12 is retained in the spindle shaft 11 for an operative metal cutting operation. The specific construction of the tool holder 12 and the collet type tool holder gripping means 60, 68 form no part of the present invention. A suitable collet type tool holder gripping means is disclosed and described in detail in the aforementioned co-pending continuation-in-part application. Some of the details of the self-locking chuck disclosed in the last mentioned application are show in FIG. 1. The numerals 119 designate locking balls which are normally biased radially outward into a locking engagement with an annular tapered ball seat 123 by a suitable spring plunger 101 and a spring 145. The locking balls 119 are released from locking engagement with the annular ball seat 123 when the draw bar and tool holder gripping means 13 is moved from the position shown in FIG. 1 to the right, so as to have the end of the draw bar 62 push the spring plunger 101 to the right against the pressure of the spring 145 to permit the locking balls 119 to move inwardly and release the tool holder 12.

The draw bar assembly 13 includes the draw bar 62 which is axially movable in a spindle bore portion 65. The front end of the draw bar 62 is piloted in a bore in the inner end of the collet body 60. The collet body 60 is retained on the draw bar 62 by a retainer assembly, generally indicated by the numeral 61, which comprises a plurality of disc type springs 61' and a suitable machine screw 6'''. A suitable disc type spring 61' is one on the market known as a belleville washer. The springs 61' are under a pre-load torque. The draw bar 62 is provided with a reduced diameter threaded rear end shaft 66 which is threadably mounted in a threaded axial bore 69 formed in a cylindrical drive nut 70. The threaded rear end shaft 66 and the drive nut 70 are preferably provided with mating left hand threads. The cylindrical drive nut 70 is rotatably positioned in a spindle shaft bore portion 71 which communicates with the spindle shaft bore portion 65.

The draw bar assembly 13 does not rotate relative to the spindle shaft 11. As shown in FIGS. 1 and 2, the draw bar 62 is provided with a portion 63 which is polygon shaped in cross section and which is located adjacent the threaded end shaft 66. As shown in FIG. 2, the polygon shaped portion 63 of the draw bar 62 is three-sided and substantially egg-shaped. The polygon shaped draw bar portion 63 is axially slidable through a mating polygon shaped bore in a sleeve 76 which is seated in the front end of the spindle shaft bore portion 71 against the shoulder formed by the junction of spindle shaft bore portions 65 and 71 (FIG. 1). The sleeve 76 is retained in place against rotation and axial movement by a pair of screws 77 which are threadably mounted transversely in the spindle shaft 11. The inner end of each screw 77 is extended into a slidble locking engagement with a suitable transverse bore in the sleeve 76. It will be seen that draw bar 62 is held against rotation relative to the spindle shaft 11 by the last described polygon mating structure but that the draw bar 62 is axially movable in the spindle shaft 11. The polygon nonrotational structure is advantageous because it can be simply manufactured and it can take a high torque and machine vibrations without any injurious effect thereon. Although conventional spline structure could be employed instead of the polygon structure, the conventional spling structure has the disadvantage of possible errors in matching the spline parts. The last mentioned errors could result in injurious vibrations. Although a three-sided polygon has been illustrated it will be understood that other type polygon structures can be employed, as for example, a four-sided polygon structure.

As shown in FIG. 1, the cylindrical drive nut 70 is retained against forward axial movement in the spindle shaft 11 by a front carbide bearing ring 72. The carbide bearing ring 72 is seated on a reduced diameter front end portion of the drive nut 70, and itis fixed to the drive nut 70 by any suitable means, as by brazing. The front carbide bearing ring 72 is seated in the spindle shaft bore portion 71 and it slidably engages the adjacent surface of a front carbide thrust bearing 64 which is fixed, as by brazing to the adjacent end of the polygon sleeve 76. A rear carbide bearing ring 73 is mounted on a reduced diameter rear end portion of the cylindrical drive nut 70, and it is fixed, as by brazing, to the drive nut 70. The rear carbide bearing ring 73 slidably engages the adjacent surface of a rear carbide thrust bearing 64' in the spindle shaft bore portion 71. The rear carbide thrust bearing 64' is fixed, as by brazing, to the adjacent end of an annular retainer collar 74 which is operatively mounted in the end of the spindle shaft bore portion 71. The annular retainer collar 74 is retained in place by suitable machine screws 75 which attach an integral radial flange on the collar 74 to the rear end of the spindle shaft 11. The numeral 78 designates a splined outer end on a reduced diameter portion of the draw bar cylindrical drive nut 70 which extends through the annular retainer collar 74 and attached carbide thrust bearing 64'. The draw nut splined end 78 extends outwardly of the annular retainer collar 74, and rearwardly beyond the inner end of the spindle shaft 11. As shown in FIG. 1, the rear end of the machine tool housing portion bore 21 is enclosed by an end plate 79 which is secured to the machine tool housing 19 by any suitable means, as by a plurality of machine screws 80. The bearing lubricant tubing 50 extends through a bore 81 formed through the end plate 79.

Figure 1A:
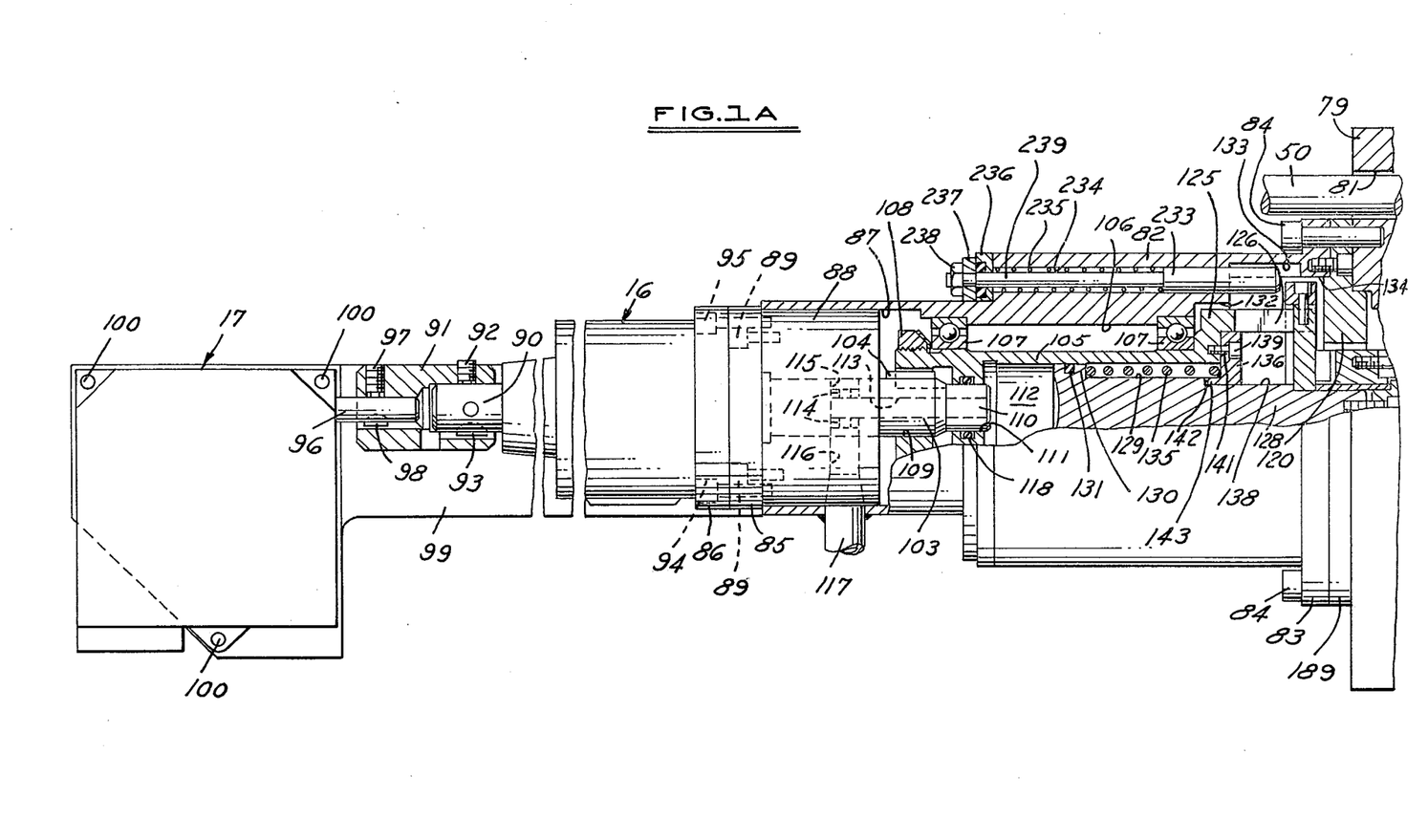
FIG. 1A is a fragmentary, broken, longitudinal view, partly in section of the rear portion of the hih speed rotary spindle assembly and draw bar assembly illustrated in FIG. 1.

As shown in FIG. 1A, a cylindrical bearing and draw bar assembly drive motor support housing 82 is provided with an annular flange 83 at the front end thereof. A spacer and locating plate 189 is juxtaposed between the flange 83 and the end plate 79. The bearing housing 82 with flange 83 and spacer plate 189 are secured to the machine tool housing end plate 79 by a plurality of suitable machine screws 84. As shown in FIG. 1A, the bearing and drive motor support housing 82 is provided with an axial bore 87 which extends inwardly at the rear end thereof, and in which is operatively mounted a cylindrical hydraulic fitting block 88 which has secured to the rear end thereof a flange 85 by a plurality of machine screws 89. The drive motor 16 has a flange 86 operatively attached to the front end thereof, and the flange 86 is secured to the flange 85 by any suitable means, as by machine screws 94. The flanges 85 and 86 are secured to the housing 82 by any suitable means, as by machine screws 95. The draw bar assembly drive motor 16 may be any suitable hydraulic motor, as for example, one available on the market and known as a Char-Lynn hydraulic motor. The drive motor 16 has a first shaft 90 extended from the rear end thereof, and it is operatively mounted in a bore in one end of a coupling 91. The motor shaft 90 is secured to the coupling 91 by a suitable set screw 92 and a Woodruff key 93. The broken collet indicator means 17 comprises a rotary limit switch which has an input shaft 96 extended from one end thereof. The input shaft 96 is operatively mounted in a bore in the coupling 91 and the last mentioned bore is aligned with the bore that contains said first motor shaft 90. The switch input shaft 96 is secured to the coupling 91 by a suitable set screw 97 and a suitable Woodruff key 98. A support arm 99 has one end fixed by any suitable means to the bearing housing 82. The rotary limit switch 17 is secured to the support arm 99 by any suitable means, as by a plurality of suitable machine screws 100. The rotary limit switch 17 may be of any suitable type, as for example, a rotary limit switch obtainable from the General Electric Company, under Model No. CR115E441102. The operation of the rotary limit switch 17 is described in detail hereinafter.

As shown in FIG. 1A, the draw bar assembly drive motor 16 is provided with a second output shaft, or drive shaft 103, which extends through the flanges 86 and 85, and the block 88, and into an axial bore 109 in the outer end of a tubular drive shaft 105. The motor drive shaft 103 is connected to the drive shaft 105 by a suitable Woodruff key 104. The motor drive shaft 103 is provided with an integral reduced diameter drive motor shaft extension 110 which is slidably mounted in a reduced diameter bore 111, in the drive shaft 105, which communicates with the bore 109 and the hydraulic fluid piston cylinder or chamber 112 which is axially formed through the drive shaft 105. An O-ring seal means 118 is operatively mounted around the outer periphery of the drive motor shaft extensions 110 in the bore 111. The drive shaft 105 is rotatably mounted in a pair of suitable ball bearing means 107 which have their outer races operatively seated in the bore 106, in the front end of the housing 82. A lock nut and washer unit 108 functions to retain the bearings 107 in place. The bore 106 communicates with the bore 87 in the rear end of the housing 82.

As shown in FIG. 1A, the hydraulic fluid piston cylinder or chamber 112 communicates at the left end thereof, as viewed in FIG. 1A, with the axial bore 111 which in turn communicates with an axial hydraulic fluid passage 113 which is formed through the drive motor shaft portions 103 and 110. The drive motor shaft portion 103 has a peripheral groove 115 formed therearound, within the block 88. The peripheral groove 115 is connected by a plurality of radially extended bores 114 with the axial bore 113. A radial bore 116 is formed through the block 88 and communicates at its inner end with the peripheral groove 115 and its outer end with a hydraulic fluid tubing 117 for admitting hydraulic fluid under pressure into the bore 116 and thence to the groove 115 and the bores 114 and into the passage 113 and chamber 112.

Figure 12:
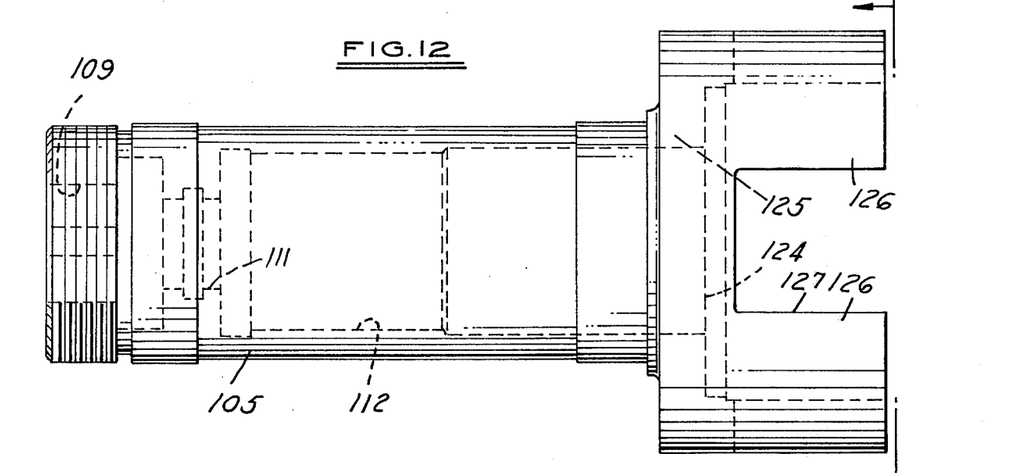
FIG. 12 is a side elevation view of the draw bar drive shaft employed in the invention.
Figure 13:
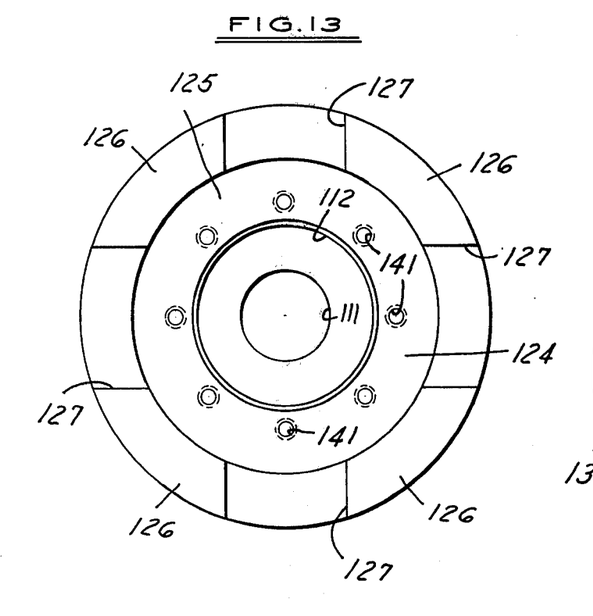
FIG. 13 is a front elevation view of the draw bar shaft structure illustrated in FIG. 12, taken along the line 13—13 thereof, and looking in the direction of the arrows.

As shown in FIGS. 1A and 12, the draw bar assembly drive motor shaft 105 is provided on its forward end with an integral, outwardly extended radial flange 125. As best seen in FIGS. 12 and 13, the drive motor shaft 105 further includes four longitudinally extended, integral driver arms 126 which are arcuate in cross section and which are spaced apart by longitudinal slots 127. As shown in FIG. 13, the driver arms 126 are spaced around the front face of the flange 125, adjacent the outer periphery thereof. The piston cylinder 112 in the drive shaft 105 terminates at the outer face of the flange 125, as indicated by the numeral 124 in FIG. 12. As shown in FIG. 1A, the drive motor housing has a plurality of stepped bore portions 132, 133 and 134 in its front end which communicate with the bore 106.

As shown in FIG. 1A, a piston 128 is slidably mounted in the piston chamber 112 in the motor shaft 105. The piston 128 functions to connect and disconnect the releasable spline means 15 which connects the draw bar 13 to the drive motor 16. The piston 128 is shown as moved to the right in FIGS. 1, 1A and FIG. 3, to its advanced or operative position for engaging the parts of the releasable spline means 15, as more fully described hereinafter.

Figure 14:
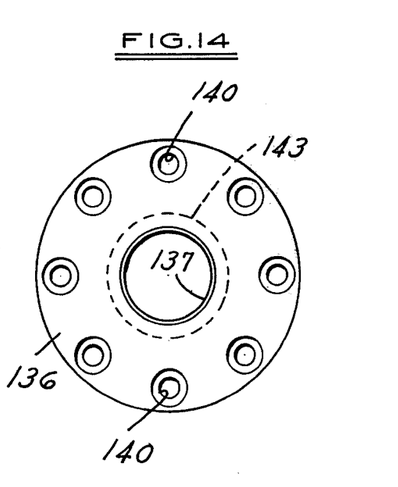
FIG. 14 is a front elevation view of the drive shaft retainer illustrated in FIG. 1, taken along the line 14—14 thereof, and looking in the direction of the arrows.

As shown in FIG. 1A, the piston 128 is formed with a stepped outer diameter, and the outer diameter portion in cylinder 112 is indicated by the numeral 129. The rear or left end, as viewed in FIG. 1A, of the piston 128 is provided with a flange 130 which is slidably mounted in the cylinder 112 and which is provided with a suitable O-ring seal 131. The flange 130 forms an abutment for one end of a piston return spring 135 which is seated around the piston outer diameter portion 129. As shown in FIGS. 1 and 1A, the other end of the return spring 135 is seated against an annular spring retainer member 136. As shown in FIG. 14, the spring retainer 136 is provided with an axial bore 137 in which is slidably received the stepped diameter outer diameter portion 138 (FIG. 1A) of the piston 128. The spring retainer 136 is secured to the flange 125 on the piston 105 by a plurality of suitable machine screws 139 which are mounted through the bores 140 (FIG. 14) and into threadable engagement with suitable threaded holes 141 in the flange 125 (FIG. 1A). As shown in FIG. 1A, the spring retainer 136 has an axial integral sleeve portion 143 which seats against the shoulder 142 formed by the junction of the stepped piston outer diameters 138 and 129.

Figure 3:
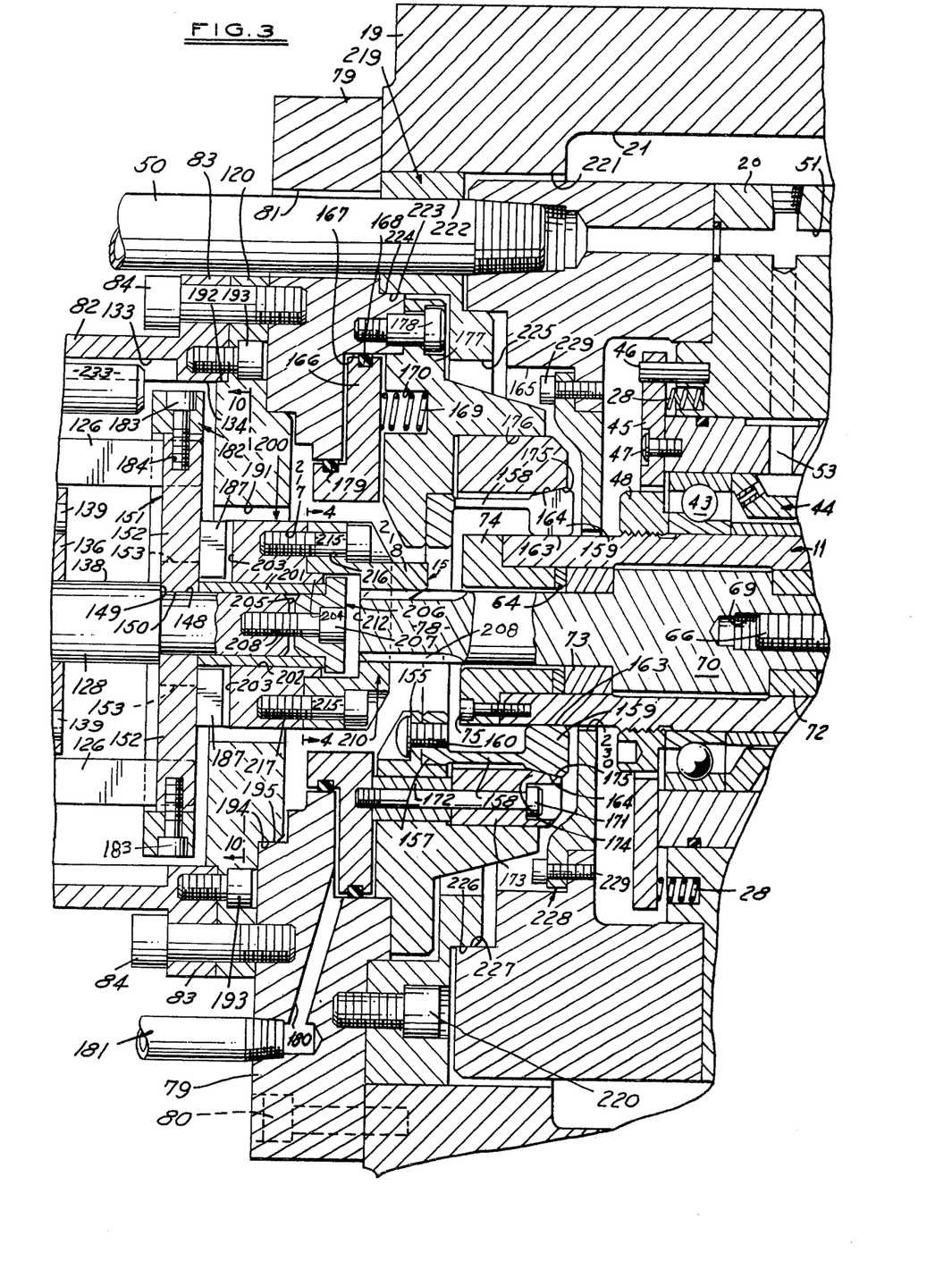
FIG. 3 is a fragmentary, enlarged, elevation section view of the draw bar actuator means shown in FIG. 1.

As shown in FIG. 3, the piston 128 is provided on its outer end with a reduced diameter portion 148 which is slidably mounted through an axial bore 150 in a drive member or spider, generally indicated by the numeral 151. The driver member 151 is seated against a shoulder 149 which is formed on the piston 128 at the junction of the reduced diameter portions 138 and 148.

Figure 10:
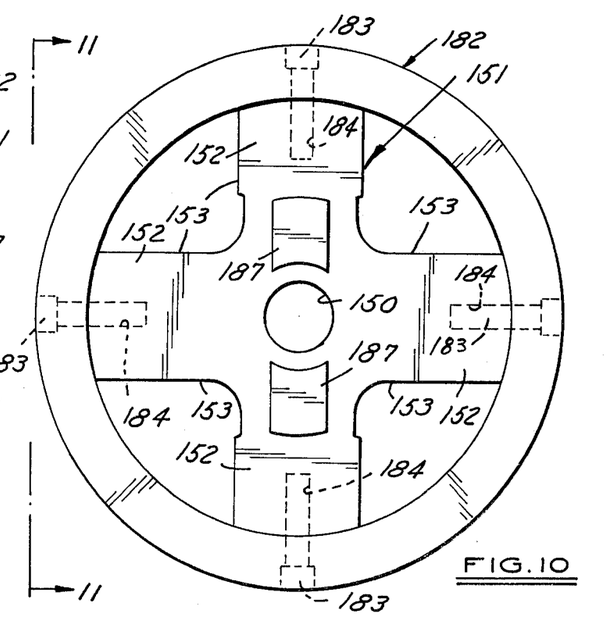
FIG. 10 is an elevation view of the drive spider and ring apparatus illustrated in FIG. 3, taken along the line 10—10 thereof, and looking in the direction of the arrows.
Figure 11:
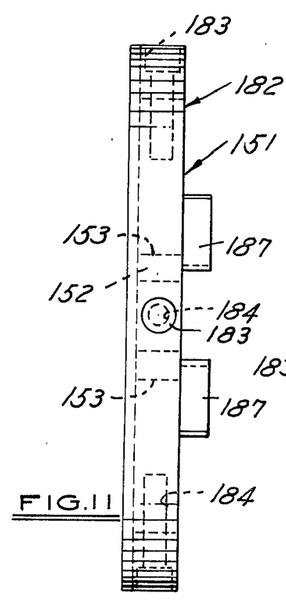
FIG. 11 is a side elevation view of the structure illustrated in FIG. 10, with the ring removed, taken along the line 11—11 thereof, and looking in the direction of the arrows.

As shown in FIGS. 10 and 11, the drive member 151 is provided with a plurality of spider arms or driver arms 152 which extend radially outward from the axial bore 150. The driver arms 152 are illustrated in FIG. 10 as being angularly spaced apart 90° and separated by a cut-out portion 153. As shown in FIGS. 3, 10 and 11, a spider ring, generally indicated by the numeral 182, is mounted about the outer ends of the driver arms 152, and it is fixed thereon by suitable machine screws 183 which are threadably mounted in threaded holes 184 in the driver arms 152. As shown in FIGS. 10 and 11, the driver member 151 is provided with a pair of driver lugs or dogs 187 which are disposed on a pair of aligned driver arms 152, in diametrically spaced apart positions on opposite sides of the driver member axial bore 150.

As shown in FIG. 3, the spacer plate 120 is provided with an axial bore 191 into which is extended the reduced diameter outer end portion 148 of the piston 128. The spacer plate 120 is provided with an annular shoulder 192 on its outer face which is seated within the front end bore 134 in the drive motor housing 82. The spacer plate 120 is secured to the drive motor housing 82 by a plurality of suitable machine screws 193. The spacer plate 120 is provided on its front side with an annular shoulder 194 which is seated on the internal shoulder 195 formed by an axial bore in the outer face of the end plate 79.

Figures 4, 5, 6:
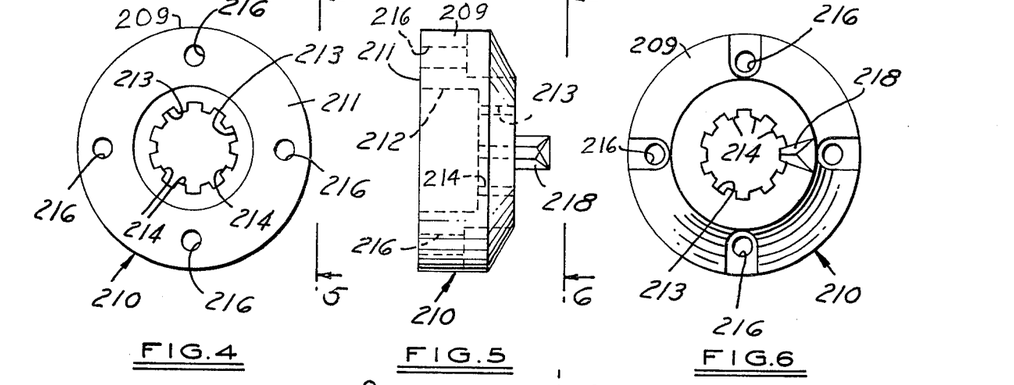
FIG. 4 is a rear end view of a female spline driver member employed in the invention, taken along the line 4—4 of FIG. 3, and looking in the direction of the arrows.
FIG. 5 is a side elevation view of the female spline driver member as illustrated in FIG. 4, taken along the line 5—5 thereof, and looking in the direction of the arrows.
FIG. 6 is a front view of the female spline driver member illustrated in FIG. 5, taken along the line 6—6 thereof, and looking in the direction of the arrows.
Figures 7, 9:
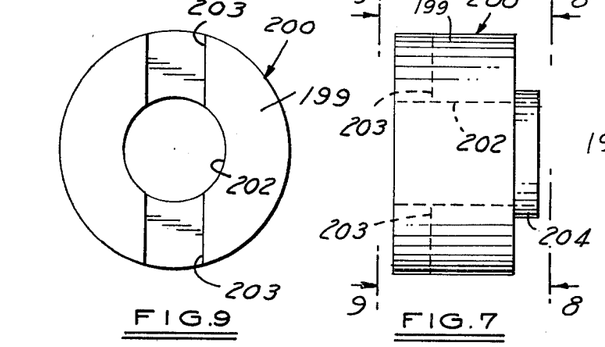
FIG. 7 is a side elevation view of a driver spline adaptor employed in the invention.
FIG. 9 is a rear end view of the female spline driver adaptor illustrated in FIG. 7, taken along the line 9—9 thereof, and looking in the direction of the arrows.
Figure 8:
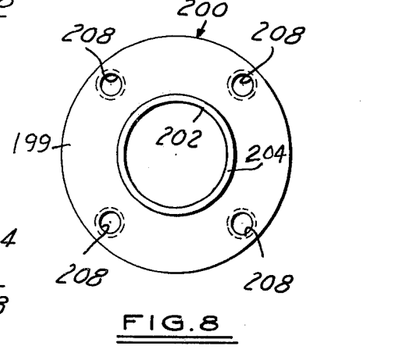
FIG. 8 is a front end view of the female spline driver adaptor illustrated in FIG. 7, taken along the line 8—8 thereof, and looking in the direction of the arrows.

As shown in FIG. 3, an adaptor member indicated by the numeral 200, is secured to the end of the shaft portion 148. As shown in FIGS. 7, 8 and 9, the adaptor 200 includes an annular body 199 which has an axial bore 202 formed therethrough in which is slidably received a tubular member or sleeve 201. The outer end portion 148 of the shaft 128 is slidably mounted into one end of the sleeve member 201, as shown in FIG. 3. As best seen in FIG. 4, the body member 199 of the adaptor 200 is provided with a pair of aligned radial slots 203 in which is slidably mounted the driving lugs 187 on the driver spider 151.

As best seen in FIGS. 3, 5 and 6, the adaptor body 199 is provided on its front end with an axially extended flange or sleeve 204. As shown in FIG. 3, the adaptor 200 is retained on the shaft 128 by a T-shaped retainer member, generally indicated by the numeral 206. The retainer member 206 has a cylindrical body portion extended into the sleeve 201, into a position spaced apart from the outer end 205 of the piston 128. The retainer member 206 has an outwardly extended cylindrical portion that seats on one end of the sleeve 201 for engaging the same and forcing the other end of the sleeve 201 into engagement with the driver spider 151 for retaining it against the shoulder 149 on the shaft 128. The retainer member 206 is secured in position on the piston 128 by a suitable machine screw 207.

As shown in FIG. 3, a female spline driver, generally indicated by the numeral 210, is operatively mounted on the front end of the adaptor 200. The female spline driver 210 is shown in detail in FIGS. 4, 5 and 6. The female spline driver 210 includes a cylindrical body portion 209 which has a flat rear face 211. An annular recess 212 is formed in the cylindrical body portion, from the rear face 211 inwardly, and it is slidably mounted over the flange 204 on the front end of the adaptor 200. The rear face 211 of the female driver 210 is seated against the front face of the adaptor 200. The female driver 210 is provided with an axial female spline bore 213 around which are formed a plurality of female spline teeth 214. As best seen in FIG. 6, the female spline driver 210 is provided with a single enlarged crown or leader tooth 218. As shown in FIG. 3, the female driver member 210 is secured to the adaptor 200 by a plurality of suitable machine screws 215 which extend through bores 216 formed through the driver 210 and into threadable engagement with threaded bores 217 formed in the adaptor 200. As shown in FIG. 3, the enlarged crown tooth 218 extends longitudinally beyond the leading ends of the other female spline teeth 214, and it is adapted to lead or guide the female spline teeth 214 into operative engagement with the male spline teeth 208 which are formed around the periphery of the splined shaft end 78 on the draw bar drive nut 70.

As shown in FIG. 3, a locating ring 219 is mounted in the outer end of the bore 221 in the machine tool housing portion 19, and it is secured to the front side of the end plate 79 by a plurality of suitable machine screws 220. The bearing lubricant tube 50 extends through a suitable bore 222 formed through the locating ring 219. The locating ring 219 has an axial, stepped bore formed therethrough which comprises the bores 223 and 225. The end plate 79 has an annular shoulder 224 formed on the front side thereof for positioning in the bore 223 of the locating ring 219. The locating ring 219 has an annular shoulder 226 on its inner side which is seated in a bore 227 in the electric motor housing 20 for locating the rear end of the housing 20. A cover plate, generally indicated by the numeral 228 in FIG. 3, is mounted in the stepped recess 165 in the rear end of the motor housing 20, and it is secured thereto by a plurality of suitable machine screws 220. The cover plate 228 is provided with an axial bore 230 for the passage therethrough of the rear end of the spindle shaft 11.

It will be seen from the foregoing that the piston 128 is moved forwardly to the position shown in FIG. 1A by hydraulic fluid admitted into the cylinder 112, which action moves the female spline driver 210 into rotative engagement with the male spindle teeth 208 formed on the drawbar drive nut splined shaft 78. When the fluid pressure is exhausted from the cylinder 112, the return spring 135 moves the piston 128 rearwardly so as to disengage the female driver member 210 from the splined shaft 78. When the female spline driver member 210 is engaged with the draw bar shaft 78, the drive motor 16 can rotate the draw bar nut 70 through the driving action of the rotatable shaft 105 and its driving engagement through its driver arms 126 with the spider arms 152 on the driver spider 151. It will be understood that the drive spider 151 slides backwardly and forwardly along the driver arms 126. Means is provided for indicating the disengagement of the female driver spline member 210 from the draw bar shaft 78 and it includes a plunger 233 (FIG. 1A) which is slidably mounted longitudinally in the drive motor housing 82. The plunger 233 is slidably mounted in a longitudinal bore 234. The plunger 23 has a reduced diameter shaft 239 integrally connected to the rear end thereof and around which is mounted a spring 235. The plunger bore 234 is enclosed at its rear end by an adaptor 236. The adaptor 236 may be connected to the housing 82 by any suitable means, as by suitable machine screws (not shown). The plunger shaft 239 extends through a suitable bore formed through the adaptor 236, and its outer extended end comprises a reduced diameter portion which extends through a bore in an operating rod 237. The operating rod 237 is held against a shoulder formed on the shaft 239, by the reduced outer end thereof and the large diameter portion thereof, by a suitable lock nut 238. The spring 235 operates to push the plunger 233 to the position shown in FIG. 1A when the female spline driver member 210 is engaged with the splined shaft 78. When the piston 128 is moved to the left, as viewed in FIG. 1A, to the inoperative position, the ring 182 (FIG. 3) which is carried on the spider 151 will engage the outer end of the plunger 233 (FIG. 3), and move the plunger 233 to the left against the pressure of the spring 235. The plunger shaft 239 will then move the operating rod 237 to the left, as viewed in FIG. 1A, to operate any suitable indicating means (not shown) to indicate that the female spline driver member 210 has been disengaged.

As shown in FIG. 3, the female spline driver 210 of the spline means 15 extends through a suitable axial opening through the flange 79. The female spline driver 210 also extends through an axial bore in a collet operating, ring-shaped piston 166 of the spindle shaft collet means 14. The piston 166 is operatively mounted in a bore 167 which is formed in the inner face of the flange 79. The piston 166 is provided with a suitable O-ring seal means 168 around the periphery thereof. The piston 166 has a rearwardly extended axial flange portion which extends into the last mentioned opening through the flange 79, and which is provided with a suitable O-ring seal 179. It will be seen that the chamber formed by the bore 167, between the seals 168 and 179, forms a piston chamber into which fluid under pressure is admitted through the passage 180 and the conduit 181, for moving the piston 166 to the active or operative position shown in FIG. 3, against the pressure of a plurality of springs 169 which are disposed in a ring about the front face of the piston 166. An annular support plate 177 is secured to the inner face of the flange 79 by a plurality of suitable machine shoulder screws 178. The springs 169 are operatively mounted in individual bores 170 in the rear face of the support plate 177. It will be seen that the springs 169 normally bias the piston 166 to the left, as viewed in FIG. 3, to an inactive or inoperative position. As shown in FIG. 3, the support plate 177 has an axial opening 155 formed therethrough, through which is extended the splined drive nut end 78 for engagement by the female spline driver 210.

An annular collet head 157 is secured to the front face of the support plate 177 by a plurality of suitable machine screws 160. The annular collet head 157 comprises a collet gripping means for gripping the spindle shaft 11, and it is provided with a plurality of integral collet fingers 158. Each of the collet fingers 158 is provided with an enlarged collet finger tip or lug 159 that has an axially extended straight inner surface 163, that is offset radially inward from its respective collet finger 158, and which is parallel to the outer surface of the spindle shaft 11. Each of the collet finger tips 159 is provided on the outer face thereof with a tapered surface 164 that diverges in the direction of the spindle shaft 11. The total of the collet outer surfaces 164 forms what may be termed a conical or frusto-concial annular cam surface which is radially spaced from the spindle shaft 11.

As shown in FIG. 3, the support plate 177 includes a portion which extends forwardly, through an axial bore 225 in the locating ring 219, or to the right as viewed in FIG. 3, and into a stepped recess 165 formed in the inner end of the motor housing 20. The spindle shaft 11 extends to the left, as shown in FIG. 3, through the last mentioned portion of the motor housing 20. A collet clamp ring 173 is seated in a bore 176 formed in the front side of the support plate 177. The collet clamp ring 173 is fixed to the collet piston 166 by a plurality of suitable machine screws 171 which are secured to the piston 166 through suitable spacers 172 that are mounted through suitable apertures formed through the support plate 177. The machine screws 171 are disposed in a circular pattern about the clamp ring 173. The clamp ring 173 is provided with a tapered front end 174 which has an inner annular surface 175 which tapers radially outward and forwardly, or in a diverging manner.

The clamp ring diverging inner end surface 175 is adapted to mate with the outer tapered surfaces 164 on the tapered collet finger tips 159, and act as a clamping and camming means, for biasing the collet fingers 158 radially inward into a clamping engagement with the rear end of the spindle shaft 11 when the collet piston 166 is moved forwardly to the active or operative position shown in FIG. 3, by hydraulic fluid under pressure flowing through the passage 180. The collet piston 166 and the clamping ring 173 are shown in the active or operative position in FIGS. 1 and 3, whereby the collet fingers 158 are in their contracted or stressed position and they are in a gripping engagement with the spindle shaft 11. Piston 166 is normally biased to the inactive or inoperative position by the plurality of annularly disposed springs 169. When the piston 166 is in the inactive or inoperative position, there is no physical contact between the collet fingers 158 and the spindle shaft 11.

In use, for an operative machine tool cutting operation, the pistons 128 and 166 are normally moved backward from the positions shown in FIGS. 1A and 3, by the action of the springs 139 and 169, to their inactive or inoperative positions. In the piston shown in FIGS. 1 and 3, the draw bar actuator means 15 and the spindle shaft holding means 14 are each in an active or operative position for tool changing. When it is desired to release the tool holder 12 and insert another tool holder, hydraulic fluid under pressure is admitted into the pressure chambers, on the rear or left sides of the pistons 128 and 166, as viewed in FIGS. 1A and 3, so as to move these pistons against the pressure of springs 135 and 169, to their operative positions shown in FIGS. 1A and 3. The last described action moves the clamp ring 173 to the right so as to move its camming surfaces 175 into operative contact with the finger tip outer surfaces and force the collet finger tips 159 radially inward into gripping engagement with the spindle shaft 11. The female spline driver member 210 is also moved to the right so as to engage it with the spline teeth 208 on the nut shaft 78 for rotating the drive nut 70. The spindle shaft 11 is thus held in a fixed position against rotation and the cylindrical actuator drive nut 70 is in a driving relationship with the motor 16 for rotating the draw bar 62 to impart axial movement thereto.

The motor 16 is actuated in a direction to rotate the drive nut 70 so as to move the threaded draw bar end 66 outward of the drive nut 70 to move the draw bar 62 to the right, as viewed in FIG. 1. The last mentioned movement of the draw bar 62 moves the tool holder gripping means comprising the collet boy 60 and the collet fingers 68 to the right and into a released position from the tool holder retention knob 67. The continued movement to the right of the draw bar 62 forces the right end of the draw bar, as viewed in FIG. 1, into operative engagement with the tool holder 12 for moving it outwardly of the spindle tapered bore 57 to release the tool holder 12 from the spindle shaft 11. If the illustrated self-locking tool holder of said copending continuation-in-part application is employed, the draw bar 62 pushes on the spring plunger 101 to release the locking balls 119 carried in the tool holder shank 56. The tool holder 12 is then removed by any suitable tool changer means and a new tool holder 12 inserted into the tapered bores 57 and 57' in the spindle shaft 11. The motor 16 is then operated in the opposite direction so as to rotate the actuator drive nut 70 in the opposite direction to move the draw bar 62 inwardly, to the left, to the position shown in FIG. 1. The last mentioned action operates the tool holder gripping means so as to draw the new tool holder 12 into the spindle shaft tapered bores 57 and 57', into an operative position in the spindle shaft 11. When the new tool holder 12 is properly positioned, the hydraulic fluid pressure operating against each of the pistons 128 and 166 is removed, and the spindle shaft holding means 14 and the draw bar actuator means 15 are released and moved by the springs 135 and 139, respectively, to the inoperative position, and the spindle shaft 11 is again free to be rotated for a machine tool cutting operation.

The collet indicator means 17 functions in the following described manner. When the tool holder gripping means, comprising the collet head 60 and collet fingers 68, are not broken but are operating correctly, the motor 16 functions through the spindle holding means 14 and the draw bar actuator means 15 to rotate the draw bar actuator drive nut 70 several revolutions in one direction to move the draw bar 62 forwardly about ⅜" to unclamp the tool holder 12. The drive nut 70 is rotated in the opposite direction to move the draw bar 62 rearwardly ⅜" to clamp a new tool holder 12 in position in the spindle 11. If a tool holder 12 is not loaded for some reason and the draw bar 62 is actuated in the clamping direction, then the draw bar 62 will be moved rearwardly beyond ⅜", as for example ½", and an overtravel switch in the switch means 17 is actuated to give a signal. Also, if a tool holder hang-up occurs, or the draw bar 62 did not clamp or unclamp a tool holder 12, then a timer switch in the switch means 17 operates after a three second interval to shut down the power to the machine controls, and the controls must be reset in order to get the power returned. Any suitable means may be employed with the switch means 17 for picking up the signal and giving either a visual or audible signal, or both. It will be seen that when the spindle shaft holding means 14 and draw bar actuator means 15 are operated, that they do not impart any longitudinal force or thrust on the spindle shaft 11 during a tool holder changing operation so as to unseat the high speed spindle shaft 11 from the bearings 33, 34, 42 and 43.

What is claimed is:

1. In a machine tool having a rotary hollow spindle shaft with a draw bar assembly including a tool holder gripping means mounted in said spindle shaft for axial movement with respect thereto, between an operative position for retaining a tool holder or the like in said spindle shaft, and an inoperative position to permit a tool holder or the like to be removed from or inserted into the spindle shaft, the combination comprising:
    (a) spindle shaft holding means for holding the spindle shaft stationary when the draw bar assembly is moved between said operative and inoperative positions;
    (b) actuator means for moving said draw bar assembly between said operative and inoperative positions, wherein said actuator means includes:
        (1) a drive motor;
        (2) means for selectively connecting and disconnecting said drive motor and said draw bar assembly;
    (c) said draw bar assembly is nonrotational relative to said spindle shaft and it includes a draw bar and a rotatable drive means for moving the draw bar axially in the spindle shaft;
    (d) said means for selectively connecting and disconnecting said drive motor and draw bar comprises a spline means for operative engagement with said draw bar assembly rotatable drive means, said spline means includes:
        (1) a fixed spline driven member connected to said draw bar assembly rotatable drive means;
        (2) a movable spline driver member for operative engagement with said fixed spline driven member;
    (e) said spindle shaft holding means includes a collet means for selective engagement with the spindle shaft for holding it stationary, or for releasing the spindle shaft for rotation; said collet means includes:
        (1) a fixed collet member having a plurality of collet fingers for gripping engagement with said spindle shaft;
        (2) a movable collet clamp ring member for camming said collet fingers into a gripping engagement with said spindle shaft for holding it stationary;
        (3) said movable collet clamp ring members are biased to inactive positions by spring means, and to active positions by fluid pressure means;
    (f) said rotatable drive means includes:
        (1) a threaded rear end shaft on the draw bar assembly, said threaded rear end shaft and cylindrical drive nut are provided with left hand threads;
        (2) a cylindrical drive nut threadably mounted on said threaded rear end shaft and engageable by said draw bar assembly means; and
        (3) the fixed spline member is integrally connected to said cylindrical drive nut.

2. In a machine tool having a rotary hollow spindle shaft with a draw bar assembly including a tool holder gripping means mounted in said spindle shaft for axial movement with respect thereto, between an operative position for retaining a tool holder or the like in said spindle shaft, and an inoperative position to permit a tool holder or the like to be removed from or inserted into the spindle shaft, the combination comprising:
    (a) spindle shaft holding means for holding the spindle shaft stationary when the draw bar assembly is moved between said operative and inoperative positions;
    (b) actuator means for moving said draw bar assembly between said operative and inoperative positions;
    (c) said actuator means includes:
        (1) a drive motor;
        (2) means for selectively connecting and disconnecting said drive motor and said draw bar assembly, said means for selectively connecting and disconnecting said drive motor and draw bar assembly includes:
            (A) a tubular drive shaft;
            (B) a piston movably mounted in said tubular drive shaft; and,
            (C) means drivably connecting said piston to said drive shaft for rotation therewith, and for relative longitudinal movement.

3. In a machine tool having a rotary hollow spindle shaft with a draw bar assembly including a tool holder gripping means mounted in said spindle shaft for axial movement with respect thereto, between an operative position for retaining a tool holder or the like in said spindle shaft, and an inoperative position to permit a tool holder or the like to be removed from or inserted into the spindle shaft, the combination comprising:
    (a) spindle shaft holding means for holding the spindle shaft stationary when the draw bar assembly is moved between said operative and inoperative positions;

(b) actuator means for moving said draw bar assembly between said operative and inoperative positions; said actuator means includes:
  (1) a drive motor;
  (2) means for selectively connecting and disconnecting said drive motor and said draw bar assembly;
  (3) said draw bar assembly is nonrotational relative to said spindle shaft and it includes a draw bar and a rotatable drive means for moving the draw bar axially in the spindle shaft;
  (4) said means for selectively connecting and disconnecting said drive motor and draw bar assembly comprises a spline means for operative engagement with said draw bar assembly rotatable drive means, said spline means includes:
    (A) a fixed spline driven member connected to said draw bar assembly rotatable drive means; and,
    (B) a movable spline driver member for operative engagement with said fixed spline driven member;
  (5) said means for selectively connecting and disconnecting said drive motor and draw bar assembly includes:
    (A) a tubular drive shaft;
    (B) a piston movably mounted in said tubular drive shaft; and,
    (C) means drivably connecting said piston to said drive shaft for rotation therewith, and for relative longitudinal movement.

4. The machine tool structure as defined in claim 3, wherein:
  (a) said fixed spline member is connected to a cylindrical drive nut mounted on a threaded rear end shaft on the draw bar assembly; and,
  (b) the movable spline member is releasably attached to said movable piston.

5. The machine tool structure as defined in claim 4, wherein:
  (a) said movable piston is movable in one direction to an operative position to move said movable spline member into driving engagement with said fixed spline member, and is movable in the opposite direction to disengage said movable spline member from said fixed spline member.

6. The machine tool structure as defined in claim 4 wherein:
  (a) said fixed spline member is a male spline member; and,
  (b) said movable spline member is a female spline member.

7. The machine tool structure as defined in claim 6, wherein:
  (a) said movable female spline member is provided with at least one crown spline tooth which extends axially outward beyond the other female spline teeth for leading the movable female spline member into driving engagement with the fixed male spline member.

8. The machine tool structure as defined in either one of claims 2 or 3, wherein, said means drivably connecting said piston to said drive shaft comprises:
  (a) a drive spider member attached to said piston and having at least one driven arm extended radially outward from the longitudinal axis of said piston; and,
  (b) said tubular drive shaft having at least one longitudinally extending driver arm slidably engageable with said at least one radial driven arm of said drive spider member, whereby when said tubular drive shaft is rotated, said at least one driver arm on said tubular drive shaft drivably engages said at least one spider driven arm for rotating the piston simultaneously with the tubular drive shaft.

9. The machine tool structure as defined in claim 8, wherein:
  (a) said tubular drive shaft is provided with a plurality of driver arms; and,
  (b) said drive spider member is provided with a plurality of spider driven arms.

10. The machine tool structure as defined in claim 8, wherein:
  (a) said drive spider member is attached to said piston by an adaptor member.

11. The machine tool structure as defined in claim 10, wherein:
  (a) said movable female spline member is attached to said adaptor member.

12. The machine tool structure as defined in claim 11, including:
  (a) means for indicating that said movable female spline member is disengaged from said fixed male spline member; and,
  (b) means carried by said drive spider member for operating said means for indicating that the spline members are disengaged when said piston is moved to an inoperative position.

* * * * *